United States Patent [19]

Coulter et al.

[11] 4,171,124
[45] Oct. 16, 1979

[54] FLAME CUTTING TIP AND TORCH HOLDER

[75] Inventors: James A. Coulter, Geneseo, Ill.; Roland E. Hasselbacher, Bettendorf, Iowa

[73] Assignee: Caterpillar Tractor Co., Peoria, Ill.

[21] Appl. No.: 923,877

[22] Filed: Jul. 12, 1978

[51] Int. Cl.² .............................................. B23K 7/00
[52] U.S. Cl. ....................................... 266/48; 266/77
[58] Field of Search ................... 266/77, 48; 148/9 R, 148/9 C, 9.5

[56] References Cited

U.S. PATENT DOCUMENTS

| 1,709,886 | 4/1929 | Smith et al. | 148/9 R |
|---|---|---|---|
| 2,376,413 | 5/1945 | Babcock | 148/9 R |
| 2,536,201 | 1/1951 | Meincke et al. | 148/9 R |
| 3,898,110 | 8/1975 | Etter | 148/9 R |
| 4,068,833 | 1/1978 | Buford | 266/77 |

Primary Examiner—W. Stallard
Attorney, Agent, or Firm—Phillips, Moore, Weissenberger, Lempio & Majestic

[57] ABSTRACT

A holder for the assembly of a conventional flame cutting torch tip (14) which provides release of the tip, and can include water cooling (42–44) of the tip during machine cutting operations. Although such tips often become fouled, the prior art has not provided sufficiently quick release for replacement purposes. The tip is held in abutment against the torch by a plurality of cam (48) actuated clamping followers (56) which wedge against the shoulder (68) of the conventional flame cutting tip when the holder is in a clamping position. The cam is operated by rotating a spring-biased (26) actuating member, preferably a circumferential ring (22), the ring being rotatable between a clamping position and a releasing position, and normally being biased by said spring into the clamping position.

24 Claims, 2 Drawing Figures

FLAME CUTTING TIP AND TORCH HOLDER

BACKGROUND OF THE INVENTION

Technical Field

This invention relates primarily to flame cutting tip and torch attachment means and more particularly to apparatus by which conventional flame cutting tips are held and released from abutting contact with conventional flame cutting torches. The invention is further useful for releasably attaching other members together.

Background Art

Conventional flame cutting torches include screw threads on the torch body exterior adjacent the end to be aligned with the cutting tip. Conventional flame cutting tips include a shoulder adjacent the end which abuts the cutting torch. The most common form of attachment for assembly of a conventional flame cutting tip to a torch consists of a nut. Such a nut is slipped over the flame cutting tip until an internal shoulder of the nut abuts the tip shoulder. A threaded portion of the upper nut end rises above the tip shoulder and threads to the flame cutting torch. This conventional attachment provides rigid abutment of a torch and tip, and proper fluid sealed alignment of gas passages within the torch and tip for delivery of combustible gases therethrough.

Conventional chucking arrangements of the nature taught for example by Guy H. Tripp in U.S. Pat. No. 3,517,940, issued June 30, 1970, have not been adapted for mounting cutting tips, and, indeed, are not readily adaptable for such use.

Disclosure of Invention

In one aspect of the present invention, a holder for two members in abutting engagement is provided which comprises a body with a linearly extending bore. The bore receives a first member from the first body end and a second member from the second body end. An actuating member is rotatably mounted to the body adjacent its first end. Means are provided for biasing the actuating member into a first rotational position relative to the body, while exertion of a force to overcome the biasing means urges the actuating member into a second rotational position. Cam means are responsive to rotation of the actuating member, and a plurality of cam follower means engage in response to the cam means movement for clamping or releasing of the first member.

After a period of operation cutting tips become fouled with slag and must be replaced, or it may be desirable to change tips to provide different flame shapes, flow rates or the like. Replacement of tips attached by conventional fastening means is often difficult since the threads have often become slag contaminated and the torch and tip are thus effectively glued together. Considerable wrenching force must be applied before the nut can be loosened; and, the torch threads can be partially stripped during such difficult removals so that the mating threads of the subsequently attached tip by means of the common nut become crossed and jammed.

Removal of tips thus commonly attached is therefore time consuming and awkward. This is particularly disadvantageous when a number of torches are arrayed for use in a computer controlled or sequenced multiple cutting operation. In such an operation many torch-tip combinations are often moved together to simultaneously cut out many identical parts from a sheet or sheets of material. Replacement of the conventionally attached fouled tip may require five or ten minutes of strenuous exertion by an operator. Also, the individual tips may be so arrayed relative to one another that it is difficult or awkward to attach a first wrench to an individual torch and a second wrench to the associated nut in order to exert a controlled force to separate or fasten together the torch and nut (and tip).

Further, depending upon the cutting requirements, it may be desirable to interchange a variety of different tips with a single conventional torch during cutting operations. Thus, more rapid and simple replacement of cutting tips than is presently available is desirable.

Finally, cooling of the cutting tip and workpiece is often necessary. Cooling must be provided by attaching a separate unit when the conventional nut attachment is used.

Accordingly, prior art attachment means for cutting torches and tips have been found to be unsatisfactory in several respects.

BRIEF DESCRIPTION OF THE DRAWINGS

The invention will be better understood by reference to the figures of the drawings wherein like numbers denote like parts throughout and wherein.

BEST MODE FOR CARRYING OUT THE INVENTION

Figure 1:
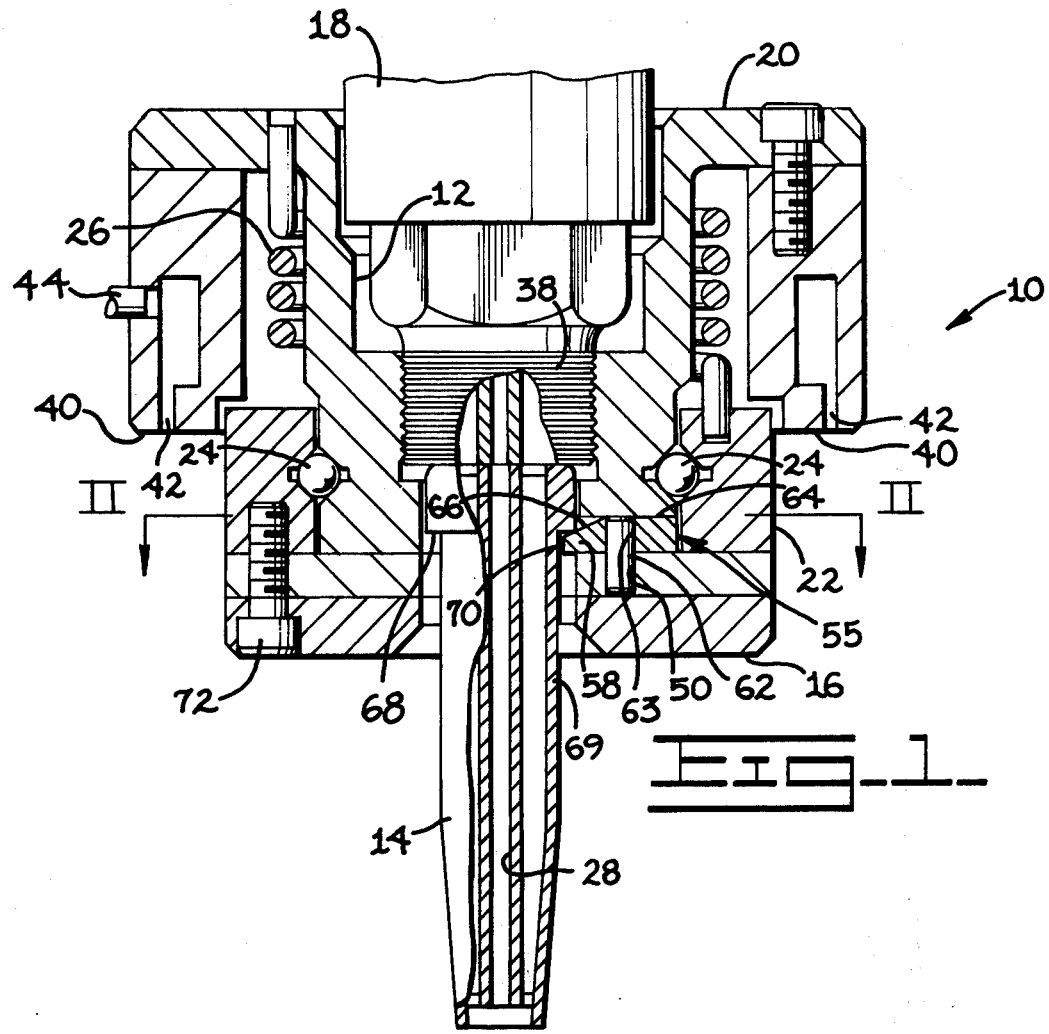
FIG. 1 is a cross-sectional view of an embodiment of a holder of the present invention and in engagement with a cutting torch and a cutting tip.

Referring first to FIG. 1, there is illustrated generally a holder of the present invention with a conventional flame cutting torch and tip abutting one another. Although the invention is particularly useful and will be herein described for conventional flame cutting torches and tips, it should be understood that the invention extends to a holder for any two members where a firm clamping but quick releasing of the members is desired.

The holder includes a body (a collar) shown generally at 10 with a linearly extending stepped-down bore 12 formed therethrough. The bore 12 receives a fluid conduit in the form of a conventional cutting tip 14 (first member) adjacent the body's first end 16. A conventional cutting torch 18 (second member) is inserted into bore 12 adjacent the body's second end 20. An actuating member, herein illustrated as a multipart, circumferential ring 22, disposed adjacent the first end 16 of the body 10, is rotatably mounted about the body 10 by any conventional means, such as the ball bearings 24 shown. The ball bearings 24 are conventionally inserted through a bore normally covered by an installation plug (not shown) releasably mounted on the body 10.

Figure 2:
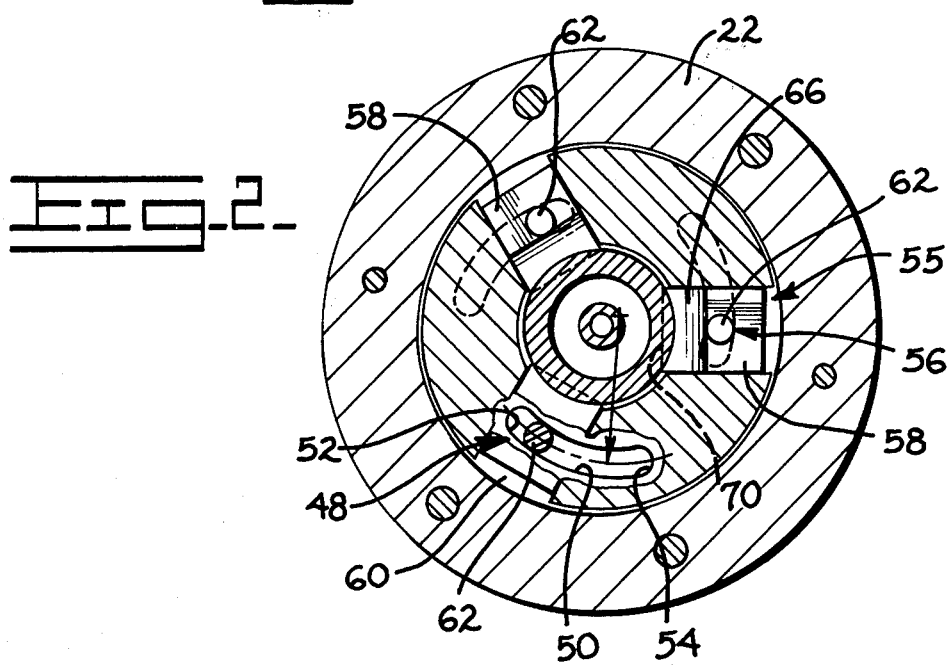
FIG. 2 is a view taken along the line II—II of FIG. 1.

Biasing means 26, preferably a torsion spring, is mounted between the ring 22 and the body 10 for normally biasing the ring counterclockwise in FIG. 2 to its first or clamping position.

When the ring 22 is rotated, usually by hand, clockwise in FIG. 2 by exertion of sufficient force to overcome the counteracting force of biasing means 26, the ring 22 is displaced to a second or releasing position whereat the tip 14 is not held against the torch 18 and hence can be removed downwardly from the bore 12 substantially without restriction. The means for releasing the tip will be described hereinafter. When the ring 22 is solely subjected to the force of biasing means 26, the ring is forced into a first rotational, or clamping position, wherein the tip 14 is abutted end to end with the torch 18 to provide a continuous fluid sealing flow passage 28 through the tip 14 and torch 18. FIGS. 1 and 2 illustrate such first position.

The interior of body 10 generally includes a plurality of screw threads 38 formed along the bore 12 to firmly engage mating threads formed on the cutting torch 18. The screw threads 38 run in a direction counter to the rotational direction achieved when ring 22 is turned from the first position to the second position whereby when the ring 22 is rotated against the force of the biasing means 26 the cutting torch body connection is not loosened.

The body's first end 16 can advantageously include means for flowing an annular curtain of water around the cutting tip 14, herein illustrated as a collar 40 in which an annular groove 42, connecting with a water inlet 44, permits water to flow in a curtain around the cutting tip 14.

Clamping and releasing of the cutting tip 14 is achieved through cam means 48, as shown more clearly in partial section by FIG. 2. The cam means 48 are carried by the ring 22 and move responsive to rotation of ring 22. In the embodiment illustrated the cam means 48 comprise radially extending eccentric cam slots 50 formed in the multi-part ring 22. The eccentric cam slots 50 are closer radially to the axis of the bore 12 at a first end 52 thereof then at a second end 54 thereof. The clamping means 55 normally engage the tip 14 for holding the tip 14 against the torch 18. Clamping means 55 include cam follower means 56 which comprises a plurality of clamping elements 58 which fit slidingly within a corresponding plurality of radially extending slots 60 formed in the body 10. A plurality of guide pins 62 also form part of the cam follower means 56. The guide pins 62 fit within respective ones of the cam slots 50 and within respective holes 63 in the corresponding clamping elements 58. As the guide pins move radially inwardly or outwardly with rotation of the ring 22 (and hence of the eccentric cam slots 50), the clamping elements 58 are forced inwardly or outwardly into or out of clamping engagement with the cutting tip 14.

The clamping elements 58 project into bore 12 to make a wedging contact with cutting tip 14 when ring 22 is in the first, or clamping position. Such wedging contact is advantageously achieved when a cutting torch facing surface 64 of each of the clamping elements 58 is chamfered toward the bore axis; the bearing portion of this surface 64 then comprises a chamfer 66 which provides wedging action against a shoulder 68 which extends radially outwardly from a barrel portion 69 of the cutting tip 14. Cutting tips 14 are conventionally made with a shoulder 68 and, hence, no modification of conventional cutting tips 14 is required. Clamping elements 58 are made short enough so that a radially inward edge 70 thereof is always spaced radially outwardly from the barrel portion 69 of the cutting tip 14. Thus the clamping force is always applied axially from the tip 14 towards the torch 18 thus assuring fluid sealing to provide the continuous flow passage 28. Also, the chamfers 66 provide a centering operation on the tip 14 through their bearing inwardly upon the shoulder 68. As the guide pins 62 are forced radially outward during clockwise rotation of the ring in FIG. 2 to the second position, the clamping elements 58 are withdrawn from wedging contact with cutting tip 14 to allow removal of the cutting tip 14 from the bore 12.

Industrial Applicability

In order to conduct flame cutting operations utilizing the holder of the present invention, a conventional flame cutting torch 18 (or a torch end of an array of torch ends or equivalent torch means) is inserted through the second end 20 of the body 10, the torch 18 being firmly held in the body 10 by screwing the torch along body mating screw threads 38. The ring 22 is rotated to the second position, and held there against the force of biasing means 26, while a conventional flame cutting tip 14 is inserted through the body's first end 16 until the tip 14 abuts the torch 18. Upon release of the holding force from the ring 22, biasing means 26 snaps ring 22 to the first, or clamping, position and aligns the tip 14 properly for forming the continuous fluid sealing flow passage 28 if the tip 14 has been initially placed somewhat out of proper alignment.

When it is desirable to remove a cutting tip 14 from a holder of the present invention, an operator needs only to rotate the ring 22 into the second position against force of the biasing means 26, easily remove the cutting tip 14 from the body 10. It is clear that slag fouling of threads is eliminated.

Other aspects, objects and advantages of this invention can be obtained from a study of the drawings, the disclosure and the appended claims.

What is claimed is:

1. A holder comprising:
   a body (10) with a linearly extending bore (12) therethrough, said bore being adapted for receiving a first member (14) from a first end (16) of said body (10) and a second member (18) from a second end (20) of said body (10);
   an actuating member (22) rotatably mounted to the body (10);
   means (26) for biasing the actuating member (22) into a first rotational position relative said body (10), said actuating member (22) being rotatable into a second rotational position by exerting a force thereto to overcome said biasing means (26);
   clamping means (55) normally engaging said first member (14) for holding said first member (14) in a fixed position relative to said second member (18) when said actuating member (22) is maintained in its first rotational position; and
   cam means (48) responsive to rotation of said actuating member (22) to its second rotational position for releasing said clamping means (55) from said first member (14) for permitting removal of said first member (14) from said holder.

2. A holder as in claim 1, wherein the biasing means (26) comprises a torsion spring (26) interconnected between said body (12) and said actuating member (22).

3. A holder as in claim 2, wherein said clamping means (55) includes a plurality of cam follower means (56) which reciprocate radially in response to movement of the cam means (48) for clamping the first member (14) in abutting relation against the second member (18) when said actuating member (22) is rotated into said first rotational position and for releasing the first member (14) when said actuating member (22) is rotated into said second rotational position.

4. A holder as in claim 3, wherein the cam means (48) defines slots (60) extending radially outwardly with respect to the bore (12) axis, said cam follower means (56) ride in said slots (60), at said second position the cam follower means (56) are forced radially outwardly in the slots (60), and at the first position the cam follower means (56) are forced radially inwardly in the slots (60).

5. A holder as in claim 4, wherein the bore (12) includes a plurality of screw threads (38) to firmly engage the second member (18), said screw threads (38) running in a direction counter to the rotational direction for moving said actuating member (22) from the first to the second rotational position thereof.

6. A holder as in claim 3, wherein said cam follower means (56) each project into said bore (12) and into wedging contact with said first member (14) when said actuating member (22) is in said first position and are withdrawn from said wedging contact when said actuating member (22) is in said second position to allow substantially unrestricted removal of said first member (14) from said bore (12).

7. A holder as in claim 6, wherein said cam follower means (56) include a plurality of clamping elements (58) which comprise a first member (14) contacting chamfer surface (66) extending toward the bore (12) axis.

8. A holder as in claim 7, wherein the first member (14) comprises a tubular barrel (69) with a shoulder (68) about one end; and
    said clamping elements (58) wedge against said first member (14) shoulder (68) at a bearing position upon the chamfered surface (66) of said clamping elements (58) and a radially inward edge (70) of each of said clamping elements (58) is spaced radially outwardly from said barrel (69) when said actuating member (22) is in the first position to form a continuous fluid sealing flow passage (28) through said first member (14) and said second member (18).

9. A holder as in claim 8, further comprising means (50) for restricting the clamping elements (58) to travel only in a radial direction.

10. A holder as in claim 9, wherein said restricting means (50) comprises a plurality of radially extending slots (50) in said body (10).

11. A holder as in claim 1, wherein the body (10) includes means (42-44) for flowing an annular curtain of water around the first member (14).

12. A holder as in claim 1, wherein the actuating member (22) comprises a ring (22).

13. A flame cutting (14) tip and torch (18) means holder, comprising:
    a body (10) with a linearly extending bore (12) therethrough, said bore (12) receiving a flame cutting tip (14) from a first end (16) of said body (10) and flame cutting torch means (18) from a second end (20) of said body (10);
    an actuating member (22) rotatably mounted to the body (10) adjacent the first end (16) thereof;
    means (26) for biasing the actuating member (22) into a first rotational position relative to said body (10), said actuating member (22) being rotatable into a second rotational position by exerting a force to overcome said biasing means (26);
    clamping means normally engaging said tip (14) for holding said tip (14) in a fixed position relative to said torch means (18) to form a continuous fluid sealing flow passage (28) through said tip (14) and said torch means (18) when said actuating member (22) is maintained in its first rotational position; and
    cam means (48) responsive to rotation of said actuating member (22) to its second rotational position for releasing said clamping means (55) from said tip (14) for permitting removal of said tip (14) from said holder.

14. A holder as in claim 13, wherein the biasing means (26) comprises a torsion spring (26) interconnected between said body (10) and said actuating member (22).

15. A holder as in claim 14, wherein said clamping means (55) include a plurality of cam follower means (56) which reciprocate radially in response to movement of the cam means (48) for clamping the tip (14) in fluid sealing abutting relation against the torch means (18) when said actuating member (22) is rotated into said first rotational position and for releasing the tip (14) when said actuating member (22) is rotated into said second rotational position.

16. A holder as in claim 15, wherein the cam means (48) define slots (50) extending radially outwardly with respect to the bore (12) axis, said cam follower means (56) ride in said slots (50), at said second position the cam follower means (56) are forced radially outwardly in the slots (50), and at the first position are forced radially inwardly in the slots (50).

17. A holder as in claim 16, wherein the bore (12) includes a plurality of screw threads (38) to firmly engage the cutting torch means (18), said screw threads (38) running in a direction counter to the rotational direction for moving said actuating member (22) from the first to the second position thereof.

18. A holder as in claim 15, wherein said cam follower means (56) each project into said bore (12) and into wedging contact with said tip (14) when said actuating member (22) is in said first position and are withdrawn from said wedging contact when said actuating member (22) is in said second position to allow substantially unrestricted removal of said cutting tip (14) from said bore (12).

19. A holder as in claim 18, wherein said cam follower means (56) include clamping elements (58) which comprise a cutting tip (14) contacting surface (64) extending toward the bore (12) axis.

20. A holder as in claim 19, wherein the cutting tip (14) comprises a tubular body (69) with a shoulder (68) about one end; and
    said clamping elements (58) wedge against said cutting tip (14) shoulder (68) at a bearing position upon a chamfer surface (66) of said clamping elements (58) when said actuating member (22) is in the first position.

21. A holder as in claim 20, further comprising:
    means (50) for restricting the clamping elements (58) to travel only in a radial direction.

22. A holder as in claim 21, wherein said restricting means (50) comprises a plurality of radially extending slots (50) in said body.

23. A holder as in claim 13, wherein the body (10) includes means (42-44) for flowing an annular curtain of water around the cutting tip (14).

24. A holder as in claim 13, wherein the actuating member (22) comprises a ring (22).

* * * * *